(12) United States Patent
Ohama

(10) Patent No.: US 6,515,773 B1
(45) Date of Patent: Feb. 4, 2003

(54) IMAGE READING APPARATUS

(75) Inventor: Takashi Ohama, Iwakura (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/318,624

(22) Filed: May 26, 1999

(30) Foreign Application Priority Data

May 28, 1998 (JP) .......................................... 10-148056

(51) Int. Cl.[7] .................................................. H04N 1/04
(52) U.S. Cl. ...................... 358/474; 358/496; 358/498
(58) Field of Search ............................... 358/496, 498, 358/474, 497, 494, 471, 400; 399/211; 250/234–236

(56) References Cited

U.S. PATENT DOCUMENTS

| 5,204,758 A | * | 4/1993 | Sakamoto ..................... 358/444 |
| 5,221,970 A | * | 6/1993 | Sakamoto et al. ........... 358/444 |
| 5,381,243 A | | 1/1995 | Imamura ..................... 358/496 |
| 5,392,134 A | * | 2/1995 | Nakano et al. .............. 358/442 |

FOREIGN PATENT DOCUMENTS

| JP | 62-77953 U | 5/1987 |
| JP | 4-29463 | 1/1992 |
| JP | 4-167854 | 6/1992 |
| JP | 5-236199 | 9/1993 |
| JP | 5-304580 | 11/1993 |
| JP | 6-37994 | 2/1994 |
| JP | 6-198957 | 7/1994 |
| JP | 7-11052 U | 2/1995 |
| JP | 10-75332 | 3/1998 |
| JP | 11-112702 | 4/1999 |

* cited by examiner

Primary Examiner—Cheukfan Lee
(74) Attorney, Agent, or Firm—Oliff & Berridge, PLC

(57) ABSTRACT

An image reading apparatus is provided with a scanner setting part 49 in which an image read scanner 27 and a contact member 59 which comes into contact with a read surface 51 of the scanner 27 at a predetermined position. The contact member 59 is always in contact with the read surface 51 while a first pressure spring 53 urges the scanner 27 to the contact member 59. In addition, an open part 63 and an elastically deformable second member 61 serve to set the scanner 27 in the scanner setting part 49 by simply sliding and rotating the scanner 27.

12 Claims, 8 Drawing Sheets

IMAGE READING APPARATUS

BACKGROUND OF THE INVENTION

1. Field of the Invention

The present invention relates to an image reading apparatus provided with a rectangular parallelepiped image read scanner which reads the images in an original on a line-by-line basis in a width direction of the original by coming into close contact with the original, and more particularly to an image reading apparatus in which an image read scanner can be mounted so that its read surface is placed in a predetermined position in order to prevent degradation in the quality of read image data.

2. Description of Related Art

In a facsimile machine which transmits data of various information recorded in an original to the party on the other end of line, an image reading apparatus built in the facsimile machine is used to read the information in the original. As a type of an image sensor mounted on a read section of the image reading apparatus, there has also been known an image read scanner such as a contact image sensor (CIS) and the like which optically reads the image information in an original by making close contact with the original.

The image read scanner is disposed at a midpoint in an original transport path configured by a frame. The scanner can more accurately read the information in the original by making close contact with the original transported into the facsimile machine by a pressing member. In order to allow the image read scanner constructed as above to accurately read the original, it is essential to make the original close contact with the scanner. To achieve this, the image read scanner has to be precisely mounted at a predetermined position in the facsimile machine so that the original may come into close contact with a read surface of the scanner.

Such the image read scanner in the conventional image reading apparatus is secured in a scanner Setting part provided in the frame by screws and the like. The scanner setting part is surrounded by many parts or numbers, thus causing a difficult mounting work of the image read scanner. Accordingly, the mounting work needs the use of a jig to adjust the mounting position of the scanner and therefore requires a long time. When the image read scanner is not precisely set in a predetermined position, the original can not close contact the image read surface of the scanner due to misalignment of the scanner, which causes degradation in the quality of read image data.

SUMMARY OF THE INVENTION

The present invention has been made in view of the above circumstances and has an object to overcome the above problems and to provide an image reading apparatus in which an image read scanner can precisely be mounted no that its image read surface is placed in a predetermined position without needing adjustment of the position of the scanner by means of screws, and an original can be made close contact with the image read surface to thereby prevent degradation in the quality of read image data.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided an image reading apparatus including a frame forming an original transport path for transporting an original having images thereon and an image read scanner having a rectangular parallelepiped shape with a read surface for reading the images on the original, the image read scanner being disposed at a midpoint of the original transport path, the image reading apparatus further including a scanner setting part for holding therein the image read scanner, the scanner setting part being formed in a concave shape perpendicular to the original transport path in the frame, the scanner setting part having a bottom wall and aide walls, a first urging member for urging an opposite surface of the image read scanner to the read surf ace toward the read surf ace side, the first urging member being disposed on the bottom wall of the scanner setting part, and contact members formed in both ends of the scanner setting part, the contact members being made contact with the read surface in both ends of the image read scanner set in the scanner setting part by an urging force of the first urging member.

According to the image reading apparatus of this invention, the first urging member urges the opposite surface to the read surface of the image read scanner toward the read surface which is always in contact with the contact member formed in the both ends of the scanner setting part, so that the image read scanner is fixed in the scanner setting part. Since the image read scanner is always in contact with the contact member formed in the scanner setting part, the contact state-between the read surface of the scanner and the original to be read depends on the position of the contact member. Thus, if only the contact member is disposed at a predetermined position, the contact state between the read surface of the scanner and the original is precisely ensured and the reproducibility of a contact state at exchange of the image read scanner is retained. This can provide image data with a constant excellent quality. In addition, there is no need of the use of screws and the like to adjust the position of the scanner to fix it in the scanner setting part. This can simplify a netting work accordingly.

According to the present invention, there is further provided an image reading apparatus including a frame forming an original transport path for transporting an original having images thereon and an image read scanner having a rectangular parallelepiped shape with a read surface for reading the images on the original, the image read scanner being disposed at a midpoint of the original transport path, the image reading apparatus further including a scanner setting part for holding therein the image read scanner, the scanner setting part being formed in a concave shape perpendicular to the original transport path in the frame, the scanner setting part having a first and a second side walls opposite to each other, a second urging member for urging the first side surface of the image read scanner, the surface being opposite to the first side wall when the scanner is set in the scanner setting part, the second urging member being formed on the first side wall of the scanner setting part, wherein a second side surface of the scanner, opposite to the first side surface, is made contact with the second side wall of the scanner setting part by an urging force of the second urging member.

According to the present invention, there is further provided, an image reading apparatus including a frame forcing an original transport path for transporting an original having images thereon and an image read scanner having a rectangular parallelepiped shape with a read surface for reading the images on the original, the image read scanner being disposed at a midpoint of the original transport path, the image reading apparatus further including, a scanner setting part for holding therein the image read scanner, the scanner setting part being formed in a concave shape perpendicular to the original transport path in the frame, the scanner setting part having a third side wall and a stopper wall opposite to each other, a third urging member for urging the third side surface of the image read scanner, the surface being opposite to the third side wall when the scanner is met in the scanner setting part, the third urging member being disposed on the third side wall of the scanner setting part, wherein a fourth side surface of the scanner, opposite to the third side surface, is made contact with the stopper wall of the scanner setting part by an urging force of the third urging member.

According to the present invention, there is further provided, a facsimile device provided with an image reading apparatus, the image reading apparatus including, a frame forming an original transport path for transporting an original having images thereon, an image read scanner having a rectangular parallelepiped shape with a read surface for reading the images on the original, the image read scanner being disposed at a midpoint of the original transport path, a scanner setting part for holding therein the image read scanner, the scanner setting part being formed in a concave shape perpendicular to the original transport path in the frame, the scanner setting part having a bottom wall and side walls, a first urging member for urging an opposite surface of the scanner to the read surface toward the read surface, the first urging member being disposed on the bottom wall of the scanner setting part, and contact members formed in both ends of the scanner setting:part, the contact members being made contact with the read surface in both ends of the image read scanner set in the scanner setting part by an urging force of the first urging member.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of an image recording apparatus embodying the present invention will now be given referring to the accompanying drawings.

Figure 1:
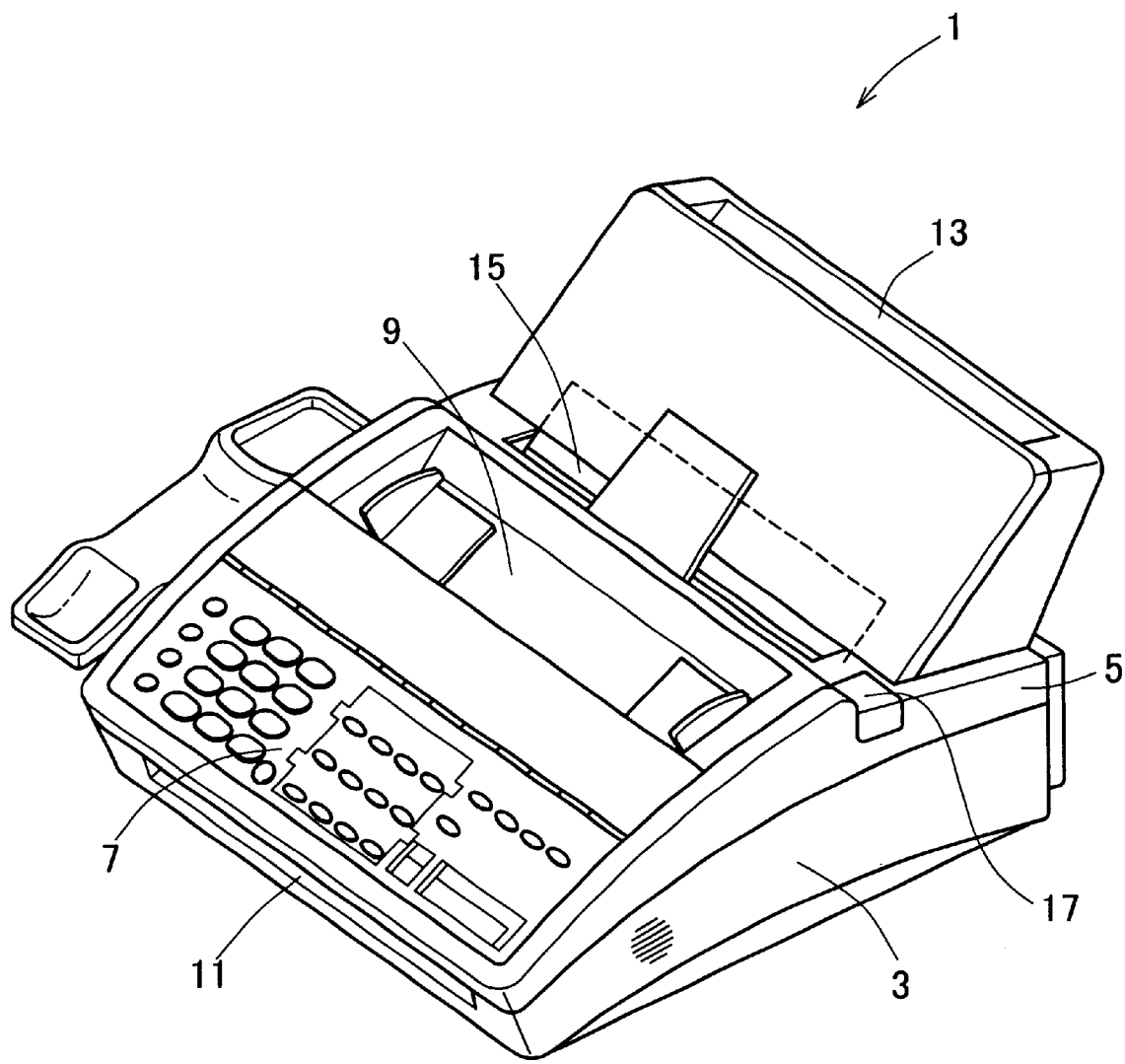
FIG. 1 is a perspective view of a facsimile machine provided with an image reading apparatus in an embodiment according to the present invention.

FIG. 1 is a perspective view of a facsimile machine 1 provided with an image recording apparatus according to the present invention. In the facsimile machine 1, a panel cover 7 and a body cover 5 are operably and closably attached to a box-like main body 3. The panel cover 7 is provided with a plurality of key switches for instructing various operations and a liquid crystal display for displaying the operating conditions of the facsimile machine 1. The body cover 5 is provided with a paper tray 13 capable of holding therein plural sheets of recording paper 14 for recording medium, a paper ejection port 15 through which the paper 14 on which data has been printed is ejected to the outside of the facsimile machine 1, and an open button 17 for releasing the engagement between the body cover 5 and the main body 3 to open the cover 5. The main body 3 is provided with an original support 9 for loading thereon an original having various recorded information and an original ejection port 11 through which the read original is ejected to the outside.

Figure 2:
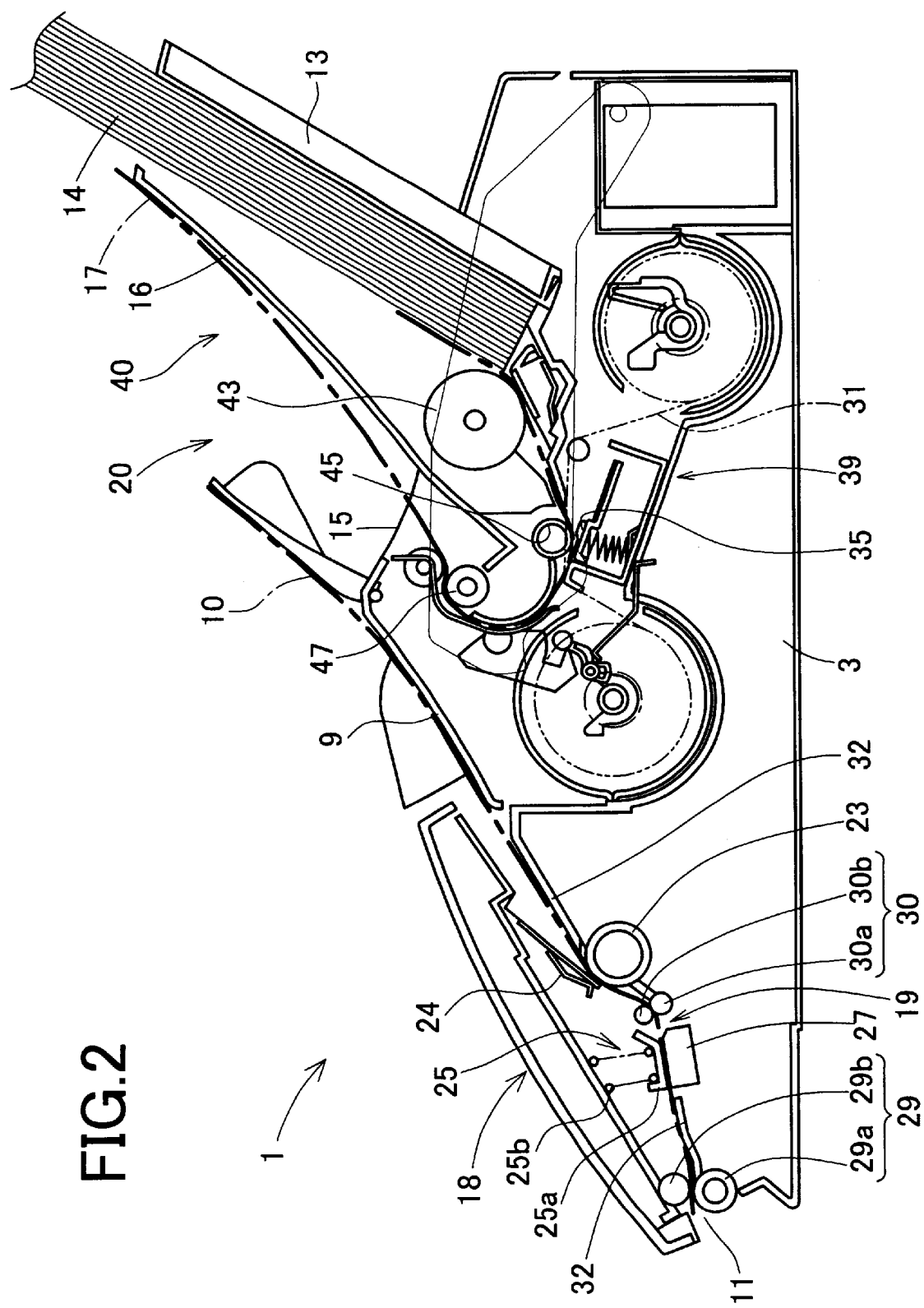
FIG. 2 is a cross sectional view of the facsimile machine of FIG. 1, sectioned along an original transport direction in the facsimile machine.
Figure 3:
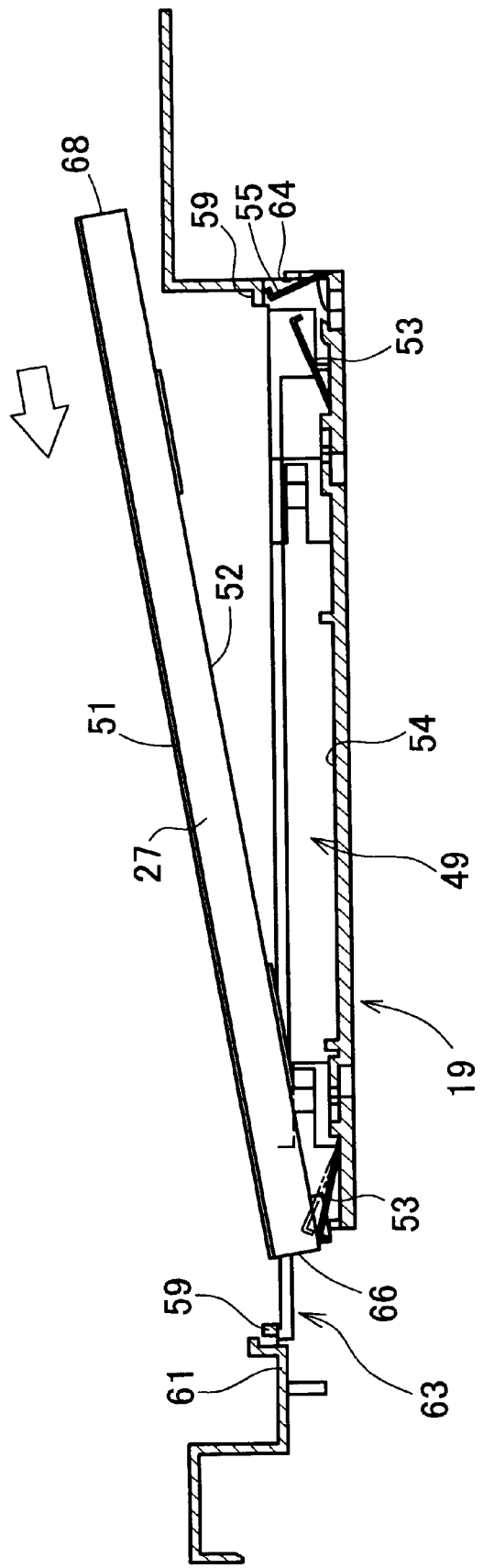
FIG. 3 is a cross sectional view of an image read scanner and a scanner setting part, sectioned along an original width direction in the facsimile machine in the present embodiment.
Figure 4:
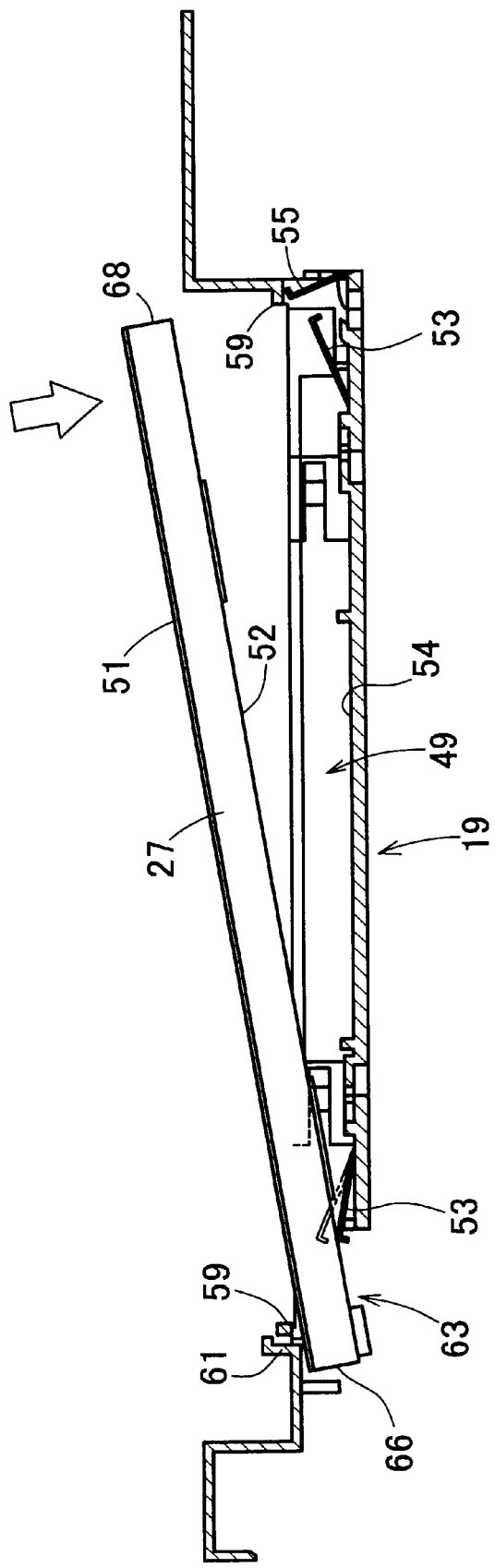
FIG. 4 is a cross sectional view of the image read scanner and the scanner setting part in a mounting step following FIG. 3.
Figure 5:
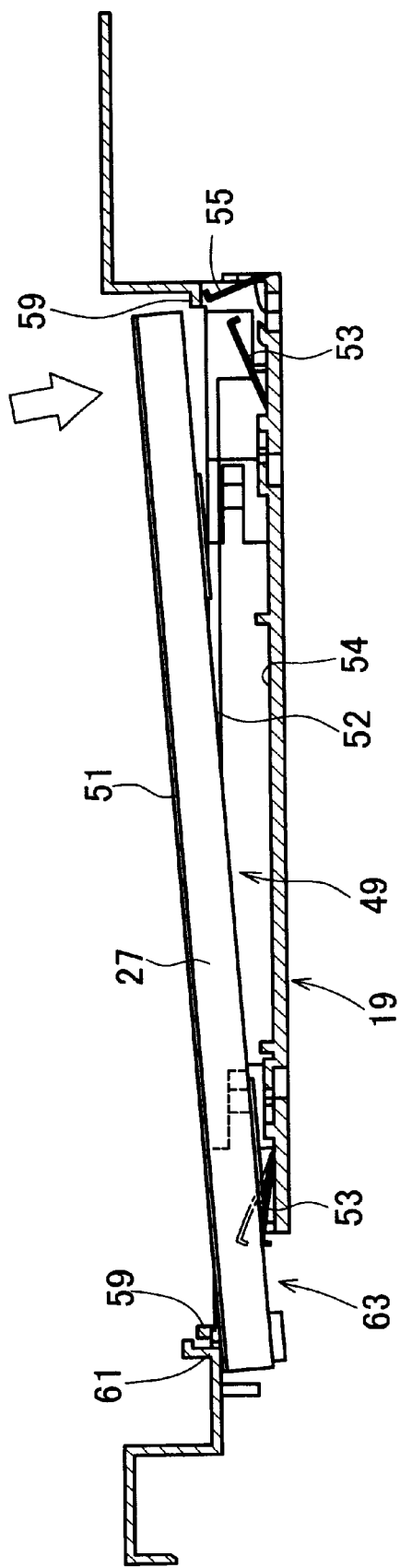
FIG. 5 is a cross sectional view of the image read scanner and the scanner setting part in a mounting step following FIG. 4.
Figure 6:
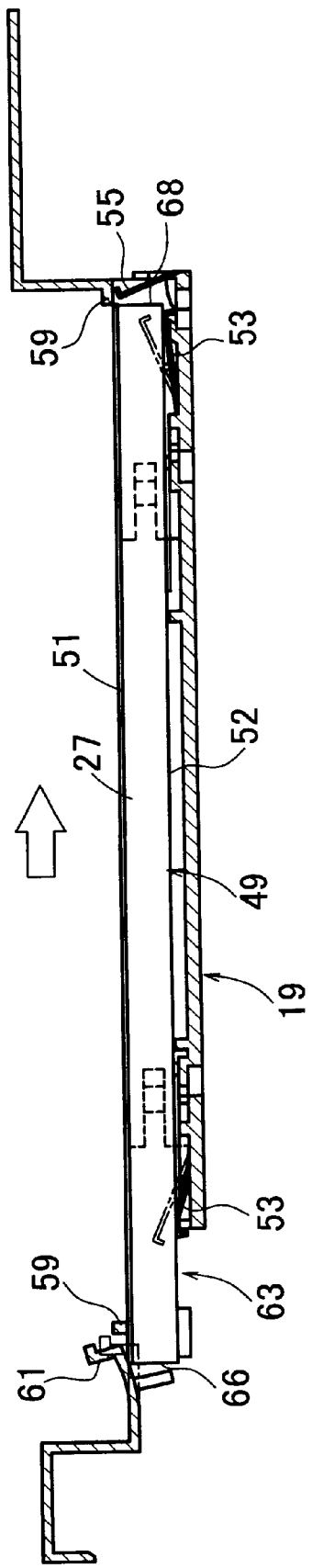
FIG. 6 is a cross sectional view of the image read scanner and the scanner setting part in a mounting step following FIG. 5.
Figure 7:
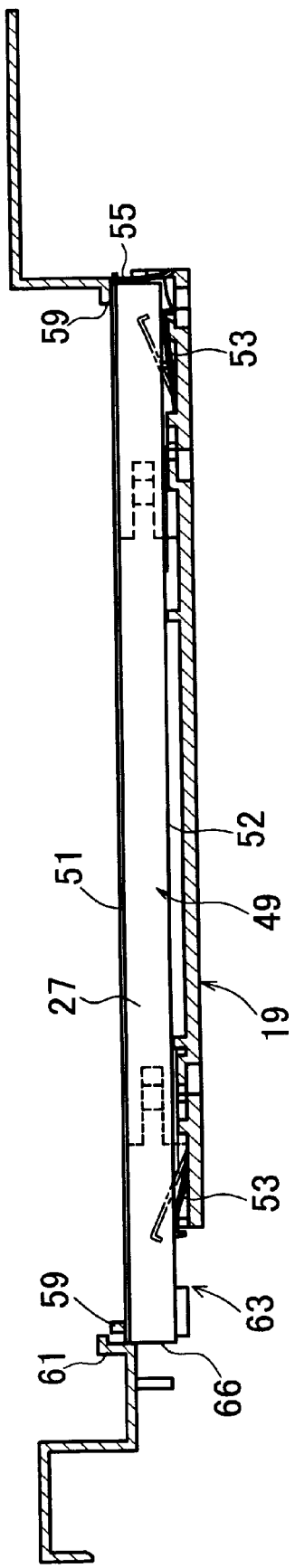
FIG. 7 is a cross sectional view of the image read scanner and the scanner setting part in a counting step following FIG. 6.

FIG. 2 is a cross sectional view of the facsimile machine 1 sectioned at its center along an original transport direction. The facsimile machine 1 includes a reading unit 18 for reading the original on a line-by-line basis in the width direction and a recording unit 20 for printing the data that the recording unit 20 received or the information to be recorded on the recording paper 14.

The reading unit 18 is constructed of an original feed roller 23, an original transport roller 30, a reading section 19, and an original ejection roller 29, and others A separating member 24 is disposed in pressure contact with the feed roller 23. The roller 23 and the separating member 24 feeds the originals one by one from the support 9 to the reading section 19 through the transport roller 30. The reading section 19 is constructed of an image read scanner 27 such an a contact image sensor (CIS), and a pressing member 25 which presses the original onto the scanner 27. This pressing member 25 is composed of a pressing plate 25a and a pressing spring 25b. The reading section 19 reads the images in the original transported thereto in every line by making the original close contact with the scanner 27. The original which has been read is then transported by the ejection roller 29 to the outside of the facsimile machine 1 through the original ejection port 11. In the present embodiment, a lower roller 30a of the original transport roller 30 receives the driving force from a motor not shown and a lower roller 29a of the original ejection roller 29 receives the driving force from a motor not shown. The original feed roller 23, the lower roller 30a, and the lower roller 29a are all disposed on a frame 32. It is to be noted that a pressing surface of the pressing member 25 is formed in white which is used for detection of a top end of an original and as a reference color of a white level.

The recording unit 20 is constructed of an ink ribbon cartridge 39 which supplies an Ink ribbon 31, a print head 35 which prints the data on the recording paper 14 on a line-by-line basis in the paper width direction, and a paper transport section 40. This paper transport section 40 is constructed of a paper feed roller 43, a paper pressure roller 45, and a paper ejection roller 47, and others, which transport, the recording paper 14 through a paper transporting path 17.

In the recording unit 20 constructed as above, the paper feed roller 43 feeds the recording paper 14 one-by-one from the paper tray 13, the pressure roller 45 presses the recording paper 14 onto the print head 35 through the ink ribbon 31, while the print head 35 prints the data and others in the original read in the reading unit 18 on the recording paper 14 on a line-by-line basis in the paper width direction. The printed recording paper 14 is then ejected by the ejection roller 47 to the outside of the facsimile machine 1 through the paper ejection port 15, and it is placed on an ejected paper support 16 integrally formed with the paper tray 13.

Next, detailed explanation is made on the mounting manner of the image read scanner 27 used in the reading section 19 of the above-constructed facsimile machine 1, referring to FIGS. 3–8.

Figure 8:
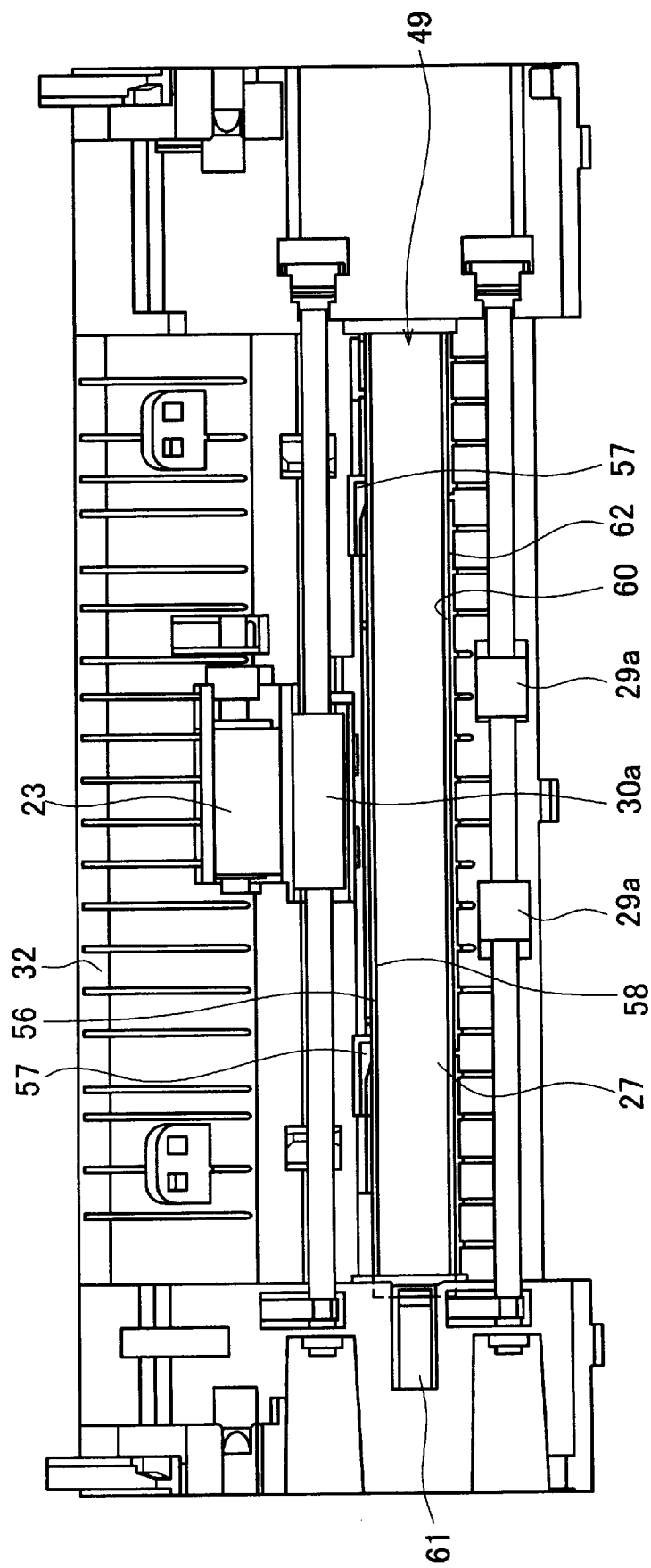
FIG. 8 is a plan view of the image read scanner mounted in the scanner setting part in the facsimile machine.

Each of FIGS. 3–7 is a cross sectional view of the image read scanner 27 and a scanner setting part 49 in which the scanner 27 is set, sectioned along the width direction of the original to be read (namely, along the length direction of the scanner 27). Those figures show a series of the steps of mounting the scanner 27 in the setting part 49. FIG. 8 is a plan view of the scanner 27 set in the setting part 49.

The image read scanner 27 in the present embodiment is a contact image sensor (CIS) formed in a long rectangular parallelepiped with a length corresponding to the width of the original to be read. It is to be noted in the present embodiment that the original width direction equals to the scanner length direction. The scanner 27 is provided, on its one surface, with a read surface 51 formed of transparent material such as glass. The scanner 27 optically reads the original which is made close contact with the read surface 51 to obtain the image data in every line. The concave scanner setting part 49 is provided with a first pressure spring 53 for urging the scanner 27 toward the read surface side, a third pressure spring 55 for urging the scanner 27 in the width-direction, a second pressure spring 57 for urging the scanner 27 in an original transport direction, contact members 59 which come into contact with the read surface 51, and a stopper member 61 which comes into contact with a side end 66 of the scanner 27 in the width direction. In the scanner setting part 49, specifically, the first spring 53 is disposed on a bottom wall 54 and the third spring 55 is disposed on a side wall 64 as shown in FIGS. 3–7, and the second spring 57 is formed on a side wall 56 (see FIG. 8). Those pressure springs and the contact members support in cooperation the scanner 27 at a predetermined position.

The image read scanner 27 is set in the scanner setting part 49 in the following manner:

At first, the scanner 27 with the read surface 51 facing up is held in a slant position and slid longitudinally (in the direction indicated by an arrow in FIG. 3) toward an open part 63 formed at one side end of the scanner getting part 49.

The scanner 27 is slid until an end of the read surface 51 (a left end in FIGS. 3–7) comes to an opposite position to the stopper member 61 (see Pig. 4). Then, the other end of the read surface 51 (a right end in FIGS. 3–7) is pushed down. Specifically, the rotational force about the open part 63 in the direction to set the scanner 27 in the scanner setting part 49 (in the direction indicated by an arrow in FIG. 4) is exerted on the scanner 27. By this rotation of the scanner 27, the left end of the read surface 51 comes into contact with the stopper member 61 (see FIG. 5). At this time, the stopper member 61 that is elastically deformable in a vertical direction is deformed by the scanner 27 rotated (see FIG. 6). While deforming the stopper member 61, the scanner 27 is fully rotated to a substantially parallel position to the bottom wall 54 of the scanner setting part 49. The scanner 27 is then slid in the direction away from the open part 63 (in the direction indicated by an arrow in FIG. 6), and an end 6B (a right end in FIG. 6) of the scanner 27 comes into contact with the contact member 59.

This sliding motion releases the contact state between the read surface 51 and the stopper member 61 (see FIG. 7), so that the scanner 27 is secured in place in the scanner setting part 49. specifically, in the width direction of the original, the scanner 27 is fixed by the third spring 55 for urging an end 68 of the scanner 27 (a right end in FIGS. 3–7) in a length direction and the stopper member 61 which restricts the length-direction movement of the scanner 27 urged by the third spring 55. Similarly, in the vertical direction, the scanner 27 is fixed by the pair of the first springs 53 urging the opposite surface 52 to the read surface 51 toward the read surface 51 side (in an upward direction in FIGS. 3–7) and the contact member 59 which restricts the upward movement of the scanner 27 urged by the first springs 53.

As shown in FIG. 8, furthermore, the scanner setting part 49 includes an upstream wall 56 formed on an upstream side with respect to the original transport direction, a pair of second pressure springs 57 integrally formed with the upstream wall 56, and a downstream wall 62 formed on a downstream side with respect to the original transport direction. The scanner 27 is further provided with an upstream surface 58 opposite to the upstream wall 56 of the scanner setting part 49 and a downstream surface 60 opposite to the downstream wall 62. When the scanner 27 is set in the scanner setting part 49, the upstream surface 58 of the scanner 27 is urged downstream with respect to the original transport direction by the second pressure springs 57, and the downstream surface 60 of the scanner 27 is made pressure contact with the downstream wall 62 of the scanner setting part 49. The movement of the scanner 27 in the original transport direction is thus restricted, and the scanner 27 is fixed in the scanner setting part 49.

The contact members 59, the stopper member 61, and the downstream wall 62 for restricting the movements of the scanner 27 in the above respective directions are disposed in the scanner setting part 49 so as to fixedly hold the scanner 27 in an appropriate position. Therefore, the image reading apparatus 1 in the present embodiment can carry out accurate image reading without adjusting the position of the scanner 27 when it in mounted in the scanner setting part 49. In other words, the scanner 27 can always be held in close contact with the original due to the position of the contact members 59 and in place in the original width direction due to the position of the stopper member 61, so that the image data with no displacement in the original width direction can be obtained. Since the downstream wall 62 of the scanner setting part 49 is formed perpendicularly to the original transport direction, similarly, the scanner 27 can accurately read the information in the original without obliquely scanning the original.

Meanwhile, in the back and front of the image read scanner 27 in the original transport path, as shown in FIG. 2 or 8, there are provided the original transport roller 30 constructed of the lower roller 30a disposed on the frame 32 and an upper roller 30b paired up with the lower roller 30a, and the original ejection roller 29 constructed of the lower roller 29a disposed on the frame 32 and an upper roller 29b paired up with the lower roller 29a. Due to those rollers 29 and 30, the original is sandwiched under pressure between the upper and lower rollers 29b and 29a (30b and 30b) and also stretched between the rollers 29 and 30. The original is thus always held under a constant tension in the vicinity of the scanner 27. This makes it possible to prevent the occurrence of crinkles and floating of the original while it is read by the scanner 27, and to achieve a stable image reading.

Although the above description was made with particular emphasis on the steps of mounting the image read scanner 27 in the scanner setting part 49, the steps of detaching the scanner 27 is carried out in a similar manner. specifically, the stopper member 61 is deformed upward to release the engagement between the end 66 of the scanner 27 and the contact ember 61, and the mounting steps shown in FIGS. 3–7 are reversed. The scanner 27 thus can easily be detached from the scanner setting part 49. This is very convenient for the exchange or maintenance of the scanner 27.

As described in detail, according to the above embodiment, if only the contact member 59 is disposed at a predetermined position, the contact state between the read surface 51 of the scanner 27 and the original is precisely ensured and the reproducibility of a contact state at exchange of the image read scanner 27 is retained. This can provide image data with a constant excellent quality. In addition, there is no need of the use of screws and the like to adjust the position of the scanner 27 to fix it in the scanner setting part 49. This can simplify a setting work accordingly The present invention may be embodied in other specific forms without departing from the spirit or essential characteristics thereof. For instance, although the first and third pressure springs 53 and 55 are formed separately from the scanner setting part 49 in the above embodiment, they may integrally be formed with the scanner setting part 49 like the second spring 57. This eliminates the need of mounting the first and second springs 53 and 55 in the scanner setting part 49, so that the scanner setting part 49 can be more simplified in structure.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image reading apparatus including a frame forming an original transport path for transporting an original having images thereon and an image read scanner having a rectangular parallelepiped shape with a read surface for reading the images on the original, the image scanner being disposed at a midpoint of the original, the image scanner being disposed at a midpoint of the original transport path, the image reading apparatus further including:

a scanner setting part for holding therein the image read scanner, the scanner setting part being formed in a concave shape perpendicular to the original transport path in the frame, the scanner setting part having a bottom wall and side walls;

a first urging member for urging an opposite surface of the image read scanner to the read surface toward the read surface side, the first urging member being disposed on the bottom wall of the scanner setting part; and contact members formed in both ends of the scanner setting part, the contact members being made in contact with the read surface in both ends of the image read scanner set in the scanner setting part by an urging force of the first urging member;

wherein the scanner setting part includes an open part in which no bottom wall exists below one of the contact members.

2. The image reading apparatus according to claim 1, wherein the scanner setting part is provided with first and second side walls opposite to each other, and the image read scanner is provided with first and second side surfaces opposite to the first and second side walls respectively when the scanner is set in the scanner setting part, and wherein the first side wall is arranged on an upstream side of the original transport path and the second side wall is arranged on a downstream side of the original transport path, so that the first and the second side walls are disposed perpendicularly to the original transport path.

3. The image reading apparatus according to claim 2 further including a second urging member for urging the first side surface of the image read scanner, the second urging member being formed on the first side wall of the scanner setting part, wherein the second side surface of the image read scanner is made contact with the second side wall of the scanner setting part by an urging force of the second urging member.

4. The image reading apparatus according to claim 2, wherein the scanner setting part is provided with a third side wall and a stopper wall, opposite to each other, the image read scanner is provided with a third and a fourth side surfaces opposite to the third side wall and the stopper wall respectively when the scanner is set in the scanner setting part.

5. The image reading apparatus according to claim 4, further including a third urging member for urging the third side surface of the image read scanner, the third urging member being disposed on the third side wall of the scanner setting part, wherein the fourth side surface of the scanner is made contact with the stopper wall of the scanner setting part by an urging force of the third urging member.

6. The image reading apparatus according to claim 5, wherein the stopper wall is elastically deformable and disposed adjacent the contact member.

7. The image reading apparatus according to claim 1, further including an original pressing member provided with a pressing surface for pressing the original transported through the original transport path onto the read surface of the image read scanner, the pressing member being disposed opposite to the image read scanner on the original transport path.

8. The image reading apparatus according to claim 7, wherein the pressing surface of the original pressing member is colored in white.

9. The image reading apparatus according to claim 1, further including a pair of original transport rollers disposed on both sides of the scanner setting part on the original transport path.

10. An image reading apparatus including a frame forming an original transport path for transporting an original having images thereon and a read scanner having a rectangular parallelepiped shape with a read surface for reading the images on the original, the image read scanner being disposed at a midpoint of the original transport path, the image reading apparatus further including:

a scanner setting part for holding therein the image read scanner, the scanner setting part being formed in a concave shape perpendicular to the original transport path in the frame, the scanner setting part having first and second side walls opposite to each other;

a second urging member for urging a first side surface of the image read scanner, the surface being opposite to the first side wall when the scanner is set in the scanner setting part, the second urging member being formed on the first side wall of the scanner setting part;

wherein the first side wall is arranged on an upstream side of the original transport path and the second side wall is arranged on a downstream side of the original transport path, so that the first and the second side walls are disposed perpendicularly to the original transport path, and wherein a second side surface of the scanner, opposite to the first side surface, is made in contact with the second side wall of the scanner setting part by an urging force of the second urging member.

11. An image reading apparatus including a frame forming an original transport path for transporting an original having images thereon and an image read scanner for reading the images on the original, the image read scanner being disposed at a midpoint of the original transport path, the image reading apparatus further including:

a scanner setting part for holding therein the image read scanner, the scanner setting part being formed in a concave shape perpendicular to the original transport path in the frame, the scanner setting part having a bottom wall and a third side wall and a stopper wall opposite to each other;

a third urging member for urging a third side surface of the image read scanner, the surface being opposite to the third side wall when the scanner is set in the scanner setting part, the third urging member being disposed on the third side wall of the scanner setting part;

wherein a fourth side surface of the scanner, opposite to the third side surface, is made in contact with the stopper wall of the scanner setting part by an urging force of the third urging member, and wherein the scanner setting part includes an open part in which no bottom wall exists below the stopper wall.

12. A facsimile device provided with an image reading apparatus, the image reading apparatus including:

a frame forming an original transport path for transporting an original having images thereon;

an image read scanner having a rectangular parallelepiped shape with a read surface for reading the images on the original, the image read scanner being disposed at a midpoint of the original transport path;

a scanner setting part for holding therein the image read scanner, the scanner setting part being formed in a concave shape perpendicular to the original transport path in the frame, the scanner setting part having a bottom wall and side walls;

a first urging member for urging an opposite surface of the scanner to the read surface toward the read surface, the first urging member being disposed on the bottom wall of the scanner setting part; and contact members formed in both ends of the scanner setting part, the contact members being made in contact with the read surface in both ends of the image read scanner set in the scanner setting part by an urging force of the first urging member;

wherein the scanner setting part includes an open part in which no bottom wall exists below one of the contact members.

* * * * *